United States Patent
Lim et al.

(10) Patent No.: US 7,526,043 B2
(45) Date of Patent: Apr. 28, 2009

(54) HIGH SPEED LINE EQUALIZER AND METHOD THEREOF

(75) Inventors: Byong Chan Lim, Gyeonggi-do (KR); Kuktae Hong, Gyeonggi-do (KR)

(73) Assignee: LG Electronics, Inc., Seoul (KR)

( * ) Notice: Subject to any disclaimer, the term of this patent is extended or adjusted under 35 U.S.C. 154(b) by 615 days.

(21) Appl. No.: 11/366,646

(22) Filed: Mar. 2, 2006

(65) Prior Publication Data

US 2007/0047636 A1    Mar. 1, 2007

(30) Foreign Application Priority Data

Aug. 30, 2005    (KR) .................... 10-2005-0079719

(51) Int. Cl.
*H04B 15/00*    (2006.01)

(52) U.S. Cl. .................. 375/285; 375/284; 375/346; 375/350; 455/43; 455/63.1; 455/234.1; 455/250.1; 455/296

(58) Field of Classification Search .......... 375/229, 375/278, 284, 285, 340, 346, 348, 350; 455/43, 455/63.1, 67.11, 67.13, 234.1, 245.1, 250.1, 455/296, 307; 329/320, 349, 350
See application file for complete search history.

(56) References Cited

U.S. PATENT DOCUMENTS

| | | | | |
|---|---|---|---|---|
| 6,002,717 A | * | 12/1999 | Gaudet | .......... 375/232 |
| 6,983,010 B1 | * | 1/2006 | Sim et al. | .......... 375/229 |
| 7,418,038 B2 | * | 8/2008 | Kikuchi | .......... 375/257 |
| 2005/0047500 A1 | * | 3/2005 | Gupta et al. | |
| 2005/0271173 A1 | * | 12/2005 | Chou et al. | |

* cited by examiner

*Primary Examiner*—Dac V Ha
(74) *Attorney, Agent, or Firm*—Lee, Hong, Degerman, Kang & Waimey (57) ABSTRACT

The present invention relates to a high speed line equalizer and a method thereof. The high speed line equalizer receives and amplifies one clock signal and at least more than one data signal. The high speed line equalizer comprises an input buffer, a first filter, at least more than one second filter, and an adaptive loop. The input buffer amplifies the clock signal. The first filter controls a high frequency gain of the clock signal according to a gain control signal. The at least more one second filter controls a high frequency gain of the at least more than one data signal according to the gain control signal. The adaptive loop calculates a gain difference between high frequency components of the amplified clock signal from the input buffer and the clock signal of which high frequency gain is controlled and outputs the gain difference as the gain control signal.

8 Claims, 10 Drawing Sheets

HIGH SPEED LINE EQUALIZER AND METHOD THEREOF

This Nonprovisional application claims priority under 35 U.S.C. § 119(a) on Patent Application No. 10-2005-0079719 filed in Korea on Aug. 30, 2005 the entire contents of which are hereby incorporated by reference.

BACKGROUND OF THE INVENTION

1. Field of the Invention

The present invention relates to a high speed line equalizer, and more particularly, to a high speed line equalizer constructed with an adaptive loop using a clock signal and equalizing a plurality of data channels using the adaptive loop, and a method thereof.

2. Description of the Background Art

Many researchers have currently focused to develop various types of high speed transmitting and receiving circuits to meet the demand of high speed communications increasingly required in data communications between boards or between systems.

However, when data are transmitted and received at high speed, a transmission speed and a transmission length are often limited due to a characteristic of a channel frequency. In more detail of characteristics of a typical channel, such a limitation increases in proportion to a square root of a frequency due to a skin effect. A frequency spectrum of a data transmitted from a transmitter exists within a wide frequency range, and thus, an input signal of a receiver often has a decreased signal integrity level due to the skin effect.

Figure 1A:
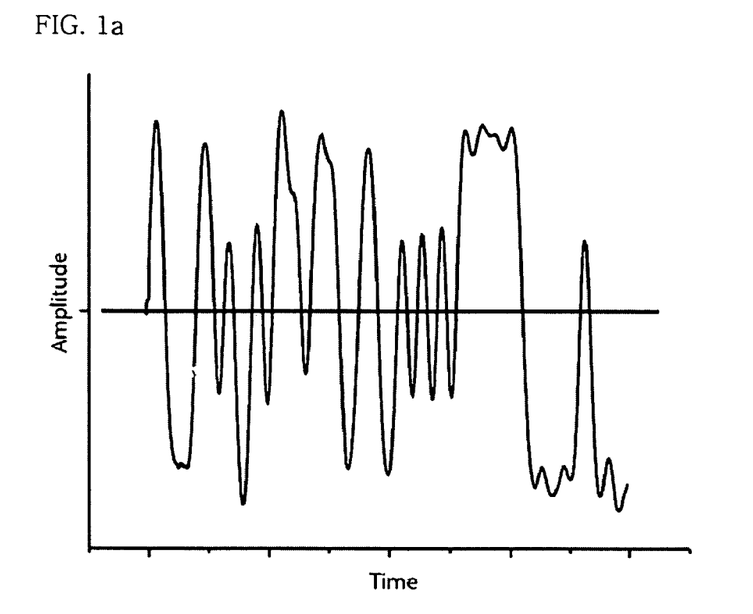
FIGS. 1a and 1b are diagrams for describing transmission characteristics of a channel in the related art.
Figure 1B:
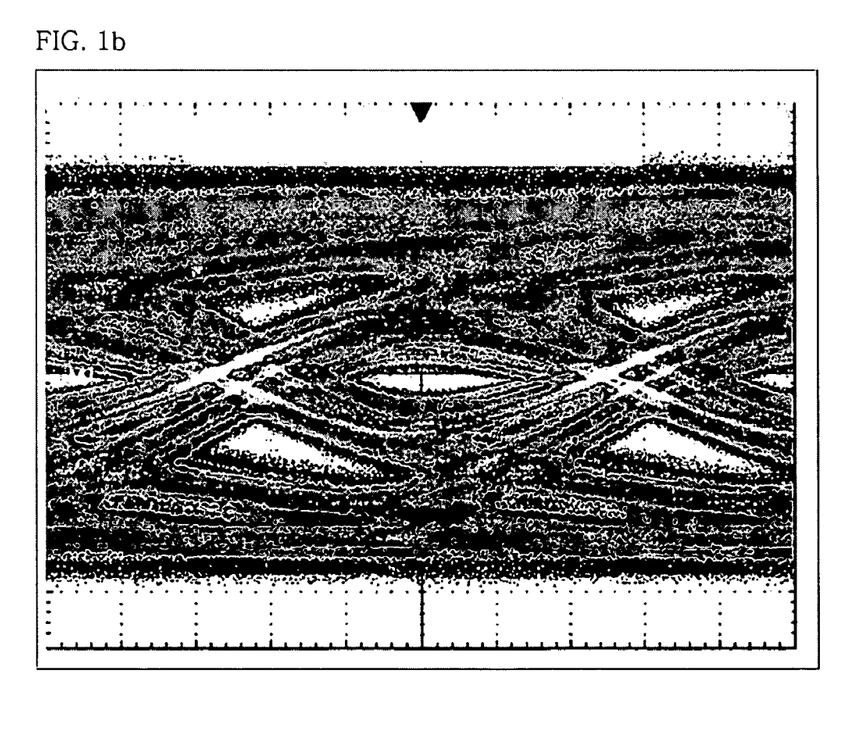

FIG. 1A is a diagram illustrating a waveform of a signal in a channel for describing the skin effect. As illustrated, a high frequency component has a lower amplitude level than a low frequency component. Such an inter-symbol interference is exhibited as an amplitude noise or a timing noise in an input signal of a receiver. As illustrated in FIG. 1B, an eye pattern of a received input signal is closed and thus, it is difficult to recover a correct signal at the receiver. This eye pattern closing event occurs more frequently when a channel length is longer or a data transmission rate increases.

A pre-emphasis method and an adaptive type equalizer have been introduced to overcome the inter-symbol interference problem. The pre-emphasis method amplifies a high frequency component considering that a signal of the high frequency component has a low amplitude level. The adaptive type equalizer adjusts a signal gain according to a frequency band in a manner to have a consistent amplitude level in all areas of the frequency band.

Figure 2:
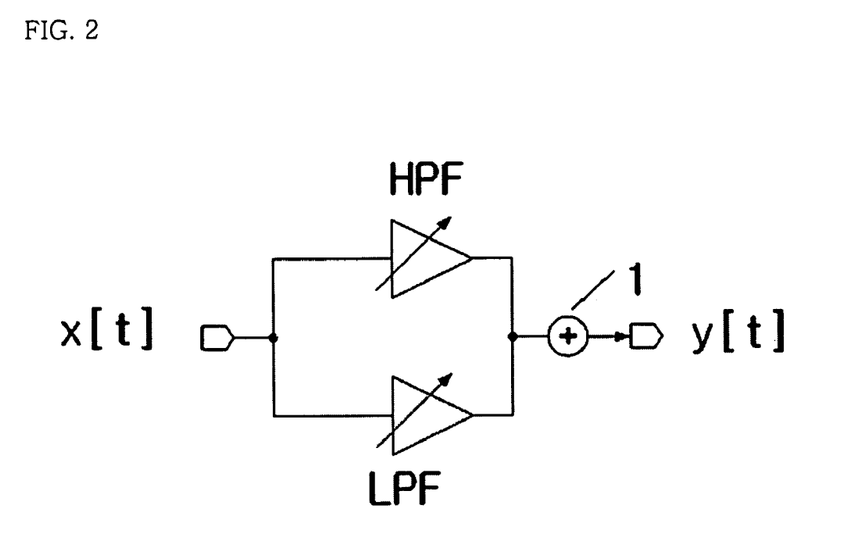
FIG. 2 is a configuration diagram briefly illustrating an equalizer used for a conventional pre-emphasis method.

FIG. 2 is a configuration diagram briefly illustrating an equalizer used for the conventional pre-emphasis method.

The equalizer comprises a high pass filter HPF, a low pass filter LPF and an amplifier 1. The high pass filter HPF amplifies a high frequency component with respect to an input signal x[t] of a receiver. The low pass filter LPF amplifies a low frequency component with respect to the input signal x[t]. The amplifier 1 amplifies outputs of the high pass filter HPF and the low pass filter LPF to a certain gain level. At this point, an amplification rate of the high pass filter HPF is set to be high to have a consistent amplitude level according to a frequency band of a final output signal y[t].

Figure 3:
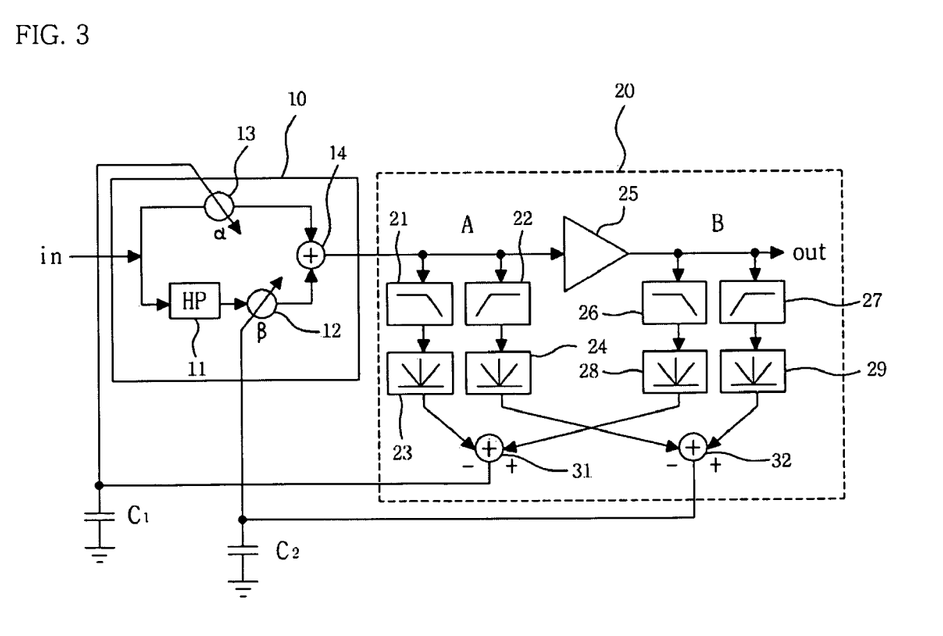
FIG. 3 is a configuration diagram illustrating a conventional adaptive type high speed line equalizer.

FIG. 3 is a configuration diagram illustrating a conventional adaptive type high speed line equalizer.

The conventional adaptive type high speed line equalizer comprises an equalizing filter 10 and an adaptive loop 20. The equalizing filter 10 performs an equalizing operation according to a gain control signal. The adaptive loop 20 calculates amplitude levels of a high frequency component and a low frequency component of an output signal from the equalizing filter 10 and generates the calculated amplitude levels as a high frequency gain control signal and a low frequency gain control signal, respectively.

More particularly, the equalizing filter 10 comprises a high pass filter HP denoted with a reference numeral 11, a first amplifier 12 and a second amplifier 13. The high pass filter 11 passes only a high frequency component of an input signal 'in.' With respect to an output signal of the high pass filter 11, the first amplifier 12 adjusts a gain of the high frequency component according to a high gain control signal β. The second amplifier 13 adjusts gains of full band frequency components of the input signal 'in' according to a low gain control signal α.

The adaptive loop 20 comprises a third amplifier 25, a group of low pass filters 21 and 26, a group of high pass filters 22 and 27, a group of rectifiers 23, 24, 28, and 29, and a group of error amplifiers 31 and 32. The third amplifier 25 amplifies an output of the equalizing filter 10. More specifically, the third amplifier 25 amplifies a signal of a node A to a certain gain rate. The group of the low pass filters 21 and 26 separates low frequency components from the node A and another node B, respectively. The group of the high pass filters 22 and 27 separates high frequency components from the node A and the other node B. The group of the rectifiers 23, 24, 28, and 29 calculates a power level of each output signal from the group of the low pass filters 21 and 26 and the group of the high pass filters 22 and 27 and performs a rectifying operation. The group of the error amplifiers 31 and 32 amplifies errors of input signals of the low frequency components and the high frequency components, respectively.

Since the conventional adaptive type high speed line equalizer utilizes a self-gain adjustment mode, the low frequency gain is sufficient at the third amplifier 25 but insufficient at the equalizing filter 10. Therefore, controlling only the high frequency gain under this condition may cause the high frequency gain at the adaptive loop 20 to be converged into an erroneous value. For this reason, as illustrated in FIG. 3, it is generally necessary to have a low frequency loop comprising the second amplifier 13, the group of the low pass filters 21 and 26, the rectifiers 23 and 28 responsible for the low frequency components, and the error amplifier 31 responsible for the low frequency components.

Also, due to the co-existence of the high frequency loop and the low frequency loop, these two loops may struggle for each other. Hence, one of the high frequency loop and the low frequency loop may not function properly.

Since the adaptive loop 20 operates based on the self-gain adjustment mode, the adaptive loop 20 should be responsive according to an input signal. As a result, the adaptive loop 20 should deal with vast ranges of a wide band frequency. Accordingly, the implementation of a circuit for the conventional adaptive type high speed line equalizer may get complicated. Particularly, when there are multiple channels, the equalizing filter 10 and the adaptive loop 20 are additionally necessary for every input channel. This additional installation of the input channels may increase the circuit area and power consumption.

SUMMARY OF THE INVENTION

Accordingly, an object of the present invention is to solve at least the problems and disadvantages of the background art.

It is an object of the present invention to provide a high speed line equalizer, which can operate stably and decrease a circuit area and power consumption by configuring one adaptive loop using a clock signal, which does not have an interference between symbols and have a specific frequency range, and equalizing multiple data channels using the one adaptive loop, and a high speed line equalizing method.

According to a first embodiment of the present invention, a high speed line equalizer for equalizing at least more than one data signal comprises an input buffer, a first filter, at least more than one second filter, and an adaptive loop. The input buffer amplifies a clock signal. The first filter controls a high frequency gain of the clock signal according to a gain control signal. The at least more than one second filter controls a high frequency gain of the at least more than one data signal according to the gain control signal. The adaptive loop calculates a gain difference between high frequency components of the amplified clock signal from the input buffer and the clock signal of which high frequency gain is controlled by the first filter and outputs the gain difference as the gain control signal.

According to the first embodiment of the present invention, the first filter or the at least more than one second filter comprises a first amplifier, a second amplifier and a gain controller. The first amplifier amplifies a gain of a high frequency component of a corresponding input signal, and the second amplifier amplifies an output signal of the first amplifier to a predetermined gain rate. The gain controller controls a high frequency gain of an output signal of the second amplifier according to the gain control signal.

According to the first embodiment of the present invention, the first amplifier comprises a first resistor and a second resistor, a first transistor and a second transistor, a high pass filter, and a first current source. Each of the first resistor and the second resistor has one end commonly connected to a first power supply terminal. One end of a main current path of each of the first transistor and the second transistor is connected to the other end of each of the first resistor and the second resistor. The high pass filter is connected to the other end of the main current path of each of the first transistor and the second transistor and performs a high pass filtering operation. Each of the first current source and the second current source is connected between a corresponding end of the high pass filter and a second power supply terminal.

According to the first embodiment of the present invention, the second amplifier comprises a third resistor and a fourth resistor, a third transistor and a fourth transistor, and third current source. Each of the third resistor and the fourth resistor has one end commonly connected to a first power supply terminal. One end of a main current path of each of the third transistor and the fourth transistor is connected to the other end of each of the third resistor and the fourth resistor, and performs a differential amplification operation to a corresponding input signal. The third current source is connected between a common node, which is generated at the other end of the main current path of the third transistor and the fourth transistor, and a second power supply terminal.

According to the first embodiment of the present invention, the gain controller comprises a fifth resistor and a sixth resistor, a fifth transistor and a sixth transistor, a fourth current source, and the seventh transistor. Each of the fifth resistor and the sixth resistor has one end commonly connected to a first power supply terminal. One end of a main current path of each of the fifth transistor and the sixth transistor is connected to the other end of each of the fifth resistor and the sixth resistor, and performs a differential amplification operation to a corresponding input signal. The fourth current source is connected between a common node, which is generated at the other end of the main current path of the fifth transistor and the sixth transistor, and a second power supply terminal. The seventh transistor has a main current path connected to both ends of the fourth current source and receives the gain control signal.

According to the first embodiment of the present invention, the adaptive loop comprises a first high pass filter and a second high pass filter, a first rectifier and a second rectifier, and an error amplifier. The first high pass filter and the second high pass filter separate high frequency components of output signals from the input buffer and the first filter, respectively. The first rectifier and the second rectifier rectifies output signals of the first high pass filter and the second high pass filter, respectively. The error amplifier amplifies a gain difference between output signals of the first rectifier and the second rectifier and outputting the gain difference as the gain control signal.

According to the first embodiment of the present invention, the high pass filter comprises a resistor and a capacitor both being connected in parallel.

According to a second embodiment of the present invention, a high speed line equalizing method for equalizing at least more than one data signal comprises controlling high frequency gains of a clock signal and the at least more than one data signal according to a gain control signal, calculating a gain difference between high frequency components of the clock signal and the clock signal of which high frequency gain is controlled, and amplifying the gain difference and outputting the amplified gain difference as the gain control signal.

BRIEF DESCRIPTION OF THE DRAWINGS

The invention will be described in detail with reference to the following drawings in which like numerals refer to like elements.

DETAILED DESCRIPTION OF PREFERRED EMBODIMENTS

Preferred embodiments of the present invention will be described in a more detailed manner with reference to the drawings.

Figure 4:
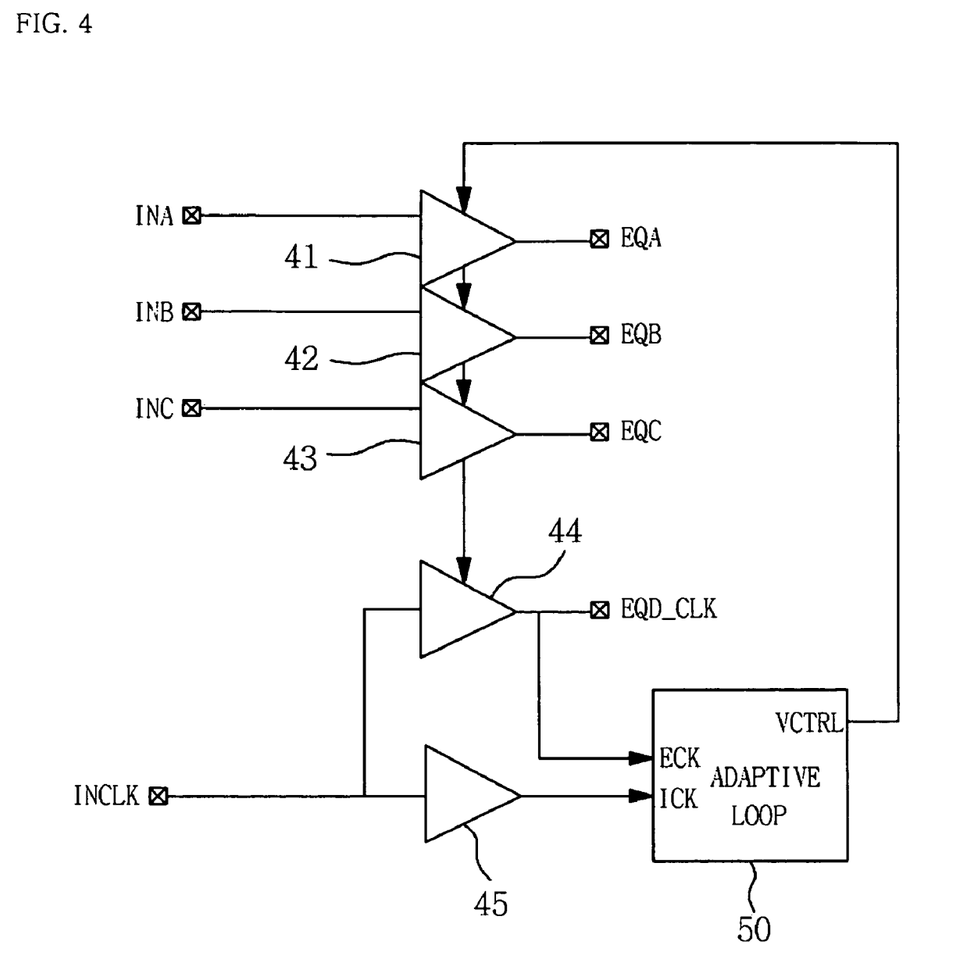
FIG. 4 is a configuration diagram depicting the concept of a high speed line equalizer in accordance with an embodiment of the present invention.

FIG. 4 is a configuration diagram depicting the concept of a high speed line equalizer in accordance with an embodiment of the present invention. Particularly, the exemplary high speed line equalizer comprises three data channels and one clock channel.

The high speed line equalizer comprises a first filter to a third filter 41, 42 and 43, a fourth filter 44, a receiving buffer 45, and an adaptive loop 50. The first filter to the third filter 41, 42 and 43 filter three data channel signals INA, INB and INC, respectively. The fourth filter 44 filters a clock channel signal INCLK. The receiving buffer 45 converts the clock channel signal INCLK with small amplitude into a clock signal with a logic level. The adaptive loop 50 calculates a gain difference between a high frequency component of a buffered clock signal ICK and that of an filtered clock signal ECK, amplifies the calculated gain difference and generates the amplified gain difference as a gain control signal VCTRL of a high frequency component comprised in each of the first filter to the fourth filter 41, 42, 43, and 44.

As for operation of the high speed line equalizer, the conventional high speed line equalizer performs an equalizing operation for each channel. On the contrary, the high speed line equalizer according to the present embodiment performs a common equalizing operation using the clock channel signal INCLK. The clock channel signal INCLK is used in the present embodiment due to specific characteristics of the clock channel signal INCLK; they are, no interference between symbols compared with the inputted data channel signals INA, INB and INC, a less jitter component and an opened eye pattern.

The adaptive loop 50 calculates a gain difference between the buffered clock signal ICK (i.e., the converted signal with the logic level by the receiving buffer 45) and the filtered clock signal ECK by the fourth filter 44 and amplifies the gain difference. The adaptive loop 50 generates the amplified gain difference as the gain control signal VCTRL.

The first filter to the fourth filter 41, 42, 43, and 44 control a gain of a high frequency component comprised in each of the inputted data channel signals INA, INB and INC and the clock channel signal INCLK according to the gain control signal VCTRL. Because of the above described specific configuration, an additional low frequency loop is not necessary.

Figure 5:
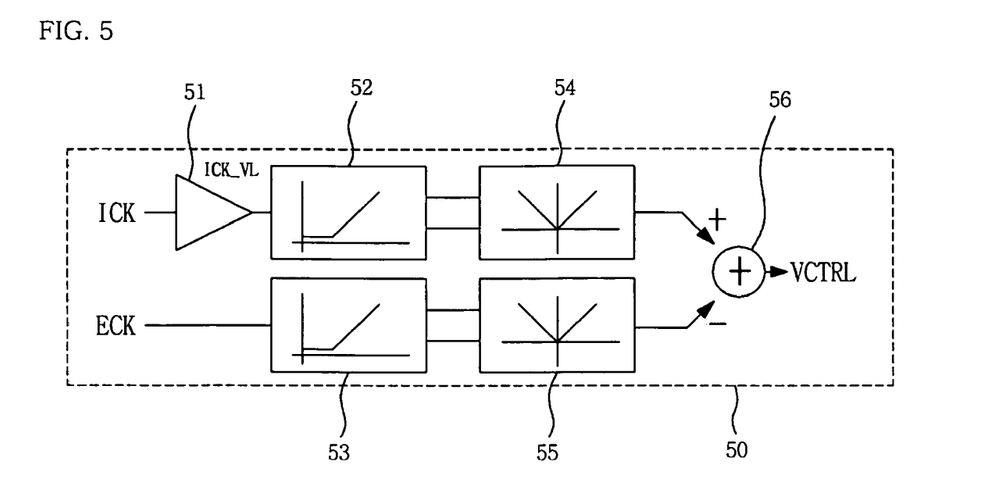
FIG. 5 is a detailed block diagram illustrating an adaptive loop of FIG. 4.

FIG. 5 is a detailed block diagram illustrating the adaptive loop 50 illustrated in FIG. 4. The adaptive loop 50 comprises an amplifier 51, high pass filters 52 and 53, rectifiers 54 and 55, and an error amplifier 56. The amplifier 51 converts the buffered clock signal ICK with the logic level (hereinafter referred to as "logic clock signal") into a clock signal ICK_VL with a voltage amplitude level (hereinafter referred to as "voltage amplitude clock signal"). The high pass filters 52 and 53 separate high frequency components, and the rectifiers 54 and 55 rectify input signals of the high pass filters 52 and 53 to calculate power levels of the input signals. The error amplifier 56 amplifies a gain difference between two output levels of the rectifiers 54 and 55.

As for operation of the adaptive loop 50, the amplifier 51 comprises a source-coupled differential amplifier, and converts the logic clock signal ICK obtained from the receiving buffer 45, wherein the logic clock signal ICK is a rough signal, into the voltage amplitude clock signal ICK_VL. The high pass filters 52 and 53 separate high frequency components of the voltage amplitude clock signal ICK_VL and the filtered clock signal ECK obtained from the fourth filter 44 illustrated in FIG. 4, and the rectifiers 54 and 55 calculate power levels of the separated high frequency components. The error amplifier 56 amplifies a gain difference between two inputted signals from the rectifiers 54 and 55 and output the amplified gain difference as the gain control signal VCTRL.

If the high frequency component of the filtered clock signal ECK has a small gain, a gain difference between the high frequency component of the filtered clock signal ECK and that of the voltage amplitude clock signal ICK_VL gets high. Thus, a voltage level of the gain control signal VCTRL also gets high. Hence, as the voltage level of the gain control signal VCTRL increases, the first filter to the fourth filter 41, 42, 43, and 44 adjust the gains of the high frequency components.

On the contrary, if the high frequency component of the voltage amplitude clock signal ICK_VL has a large gain, the voltage level of the gain control signal VCTRL gets low. Thus, the first filter to the fourth filter 41, 42, 43, and 44 perform a negative feedback loop operation that lowers the gains of the high frequency components.

On the basis of the above described configuration, the adaptive loop 50 generates the gain control signal VCTRL using the high frequency component signals, and thus, controlling a gain of a low frequency component is not necessary. As a result, compared with the conventional equalizer, the high speed line equalizer according to the present embodiment has a circuit which is simplified and can be implemented easily. Since the filtered clock signal ECK whose gain with respect to the high frequency component is adjusted through the fourth filter 44 is compared with the voltage amplitude clock signal ICK_VL which is considered an ideal waveform, a convergence rate is fast and a stable operation can be achieved. In the case of multiple channels, the generation of the gain control signal VCTRL with using the clock signals (i.e., the buffered clock signal ICK and the filtered clock signal ECK) can decrease a circuit area in a greater extent in comparison with the conventional equalizer which applies an additional adaptive loop for each data channel.

Figure 6:
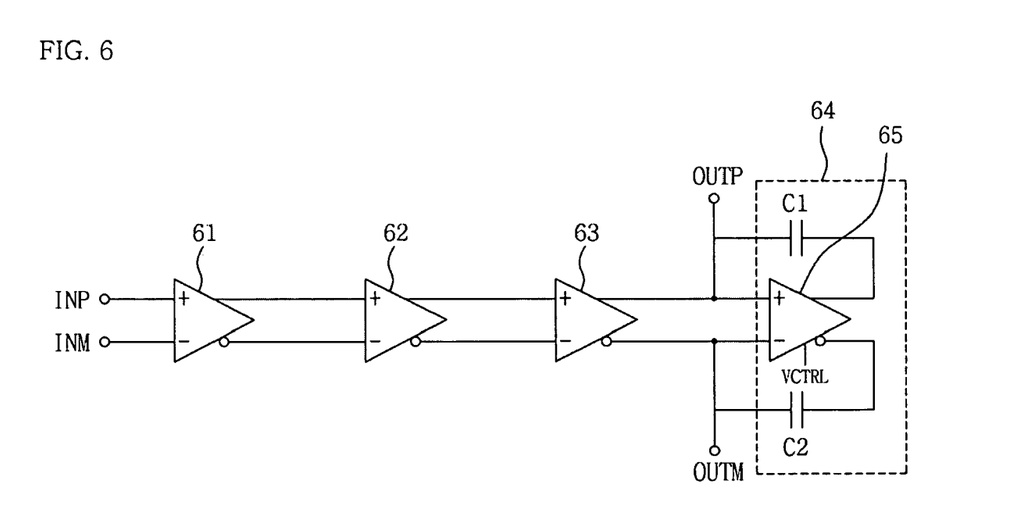
FIG. 6 is a detailed block diagram illustrating equalizing filters of FIG. 4.

FIG. 6 is a detailed block diagram illustrating the first filter to the third filter 41, 42 and 43 illustrated in FIG. 4. The first filter to the third filter 41, 42 and 43 comprise a high frequency amplifier 61, two amplifiers 62 and 63 and a gain controller 64. The high frequency amplifier 61 amplifies high frequency gains of differential input signals INP and INM to a predetermined gain rate. The two amplifiers 62 and 63 maintain a high frequency gain and have a wide band characteristic to sufficiently boost a direct current gain. The two amplifiers 62 and 63 are connected in series. The gain controller 64 controls gains of the inputted signals according to the gain control signal VCTRL.

At this point, the gain controller 64 comprises an amplifier 65, a first capacitor C1 and a second capacitor C2. The amplifier 65 controls a gain according to the gain control signal VCTRL. Each of the first capacitor C1 and the second capacitor C2 is coupled between a differential input terminal and a differential output terminal of the amplifier 65 to boost a high frequency component.

Figure 7A:
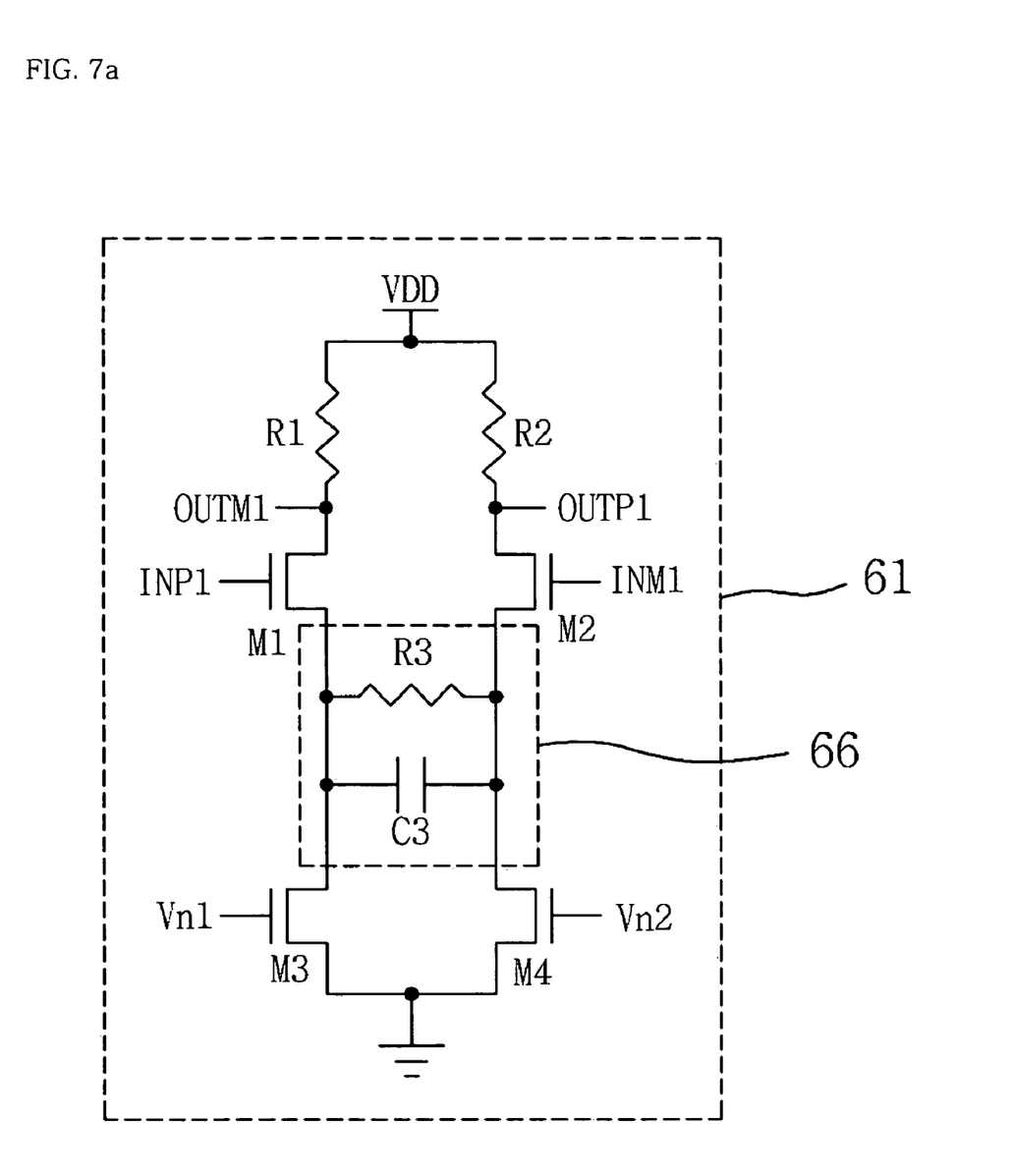
FIGS. 7a through 7c are detailed circuit diagrams illustrating equalizing filters of FIG. 6.

FIG. 7a is a detailed circuit diagram illustrating the high frequency amplifier 61 of FIG. 6.

The high frequency amplifier 61 comprises a first resistor R1 and a second resistor R2, a first N-channel metal oxide semiconductor (NMOS) transistor M1 and a second NMOS transistor M2, a high pass filter 66, and a third NMOS transistor M3 and a fourth NMOS transistor M4. Each of the first resistor RI and the second resistor R2 has one end commonly connected to a power supply terminal VDD. The first NMOS transistor M1 and the second NMOS transistor M2 have drain ends connected to the other ends of the first resistor R1 and the second resistor R2, respectively, and perform a differential amplification operation by taking differential input terminals INP1 and INM1 as inputs of gates, respectively. The high pass filter 66 comprises a third resistor R3 and a third capacitor C3, and the third resistor R3 connected with source ends of the first NMOS transistor M1 and the second NMOS transistor M2 to perform a high pass filtering operation. The third NMOS transistor M3 and the fourth NMOS transistor M4 operate as fixed current sources taking fixed voltages Vn1 and Vn2 as gate voltages, respectively. Reference denotations OUTM1 and OUTP1 represent differential output terminals.

Figure 7B:
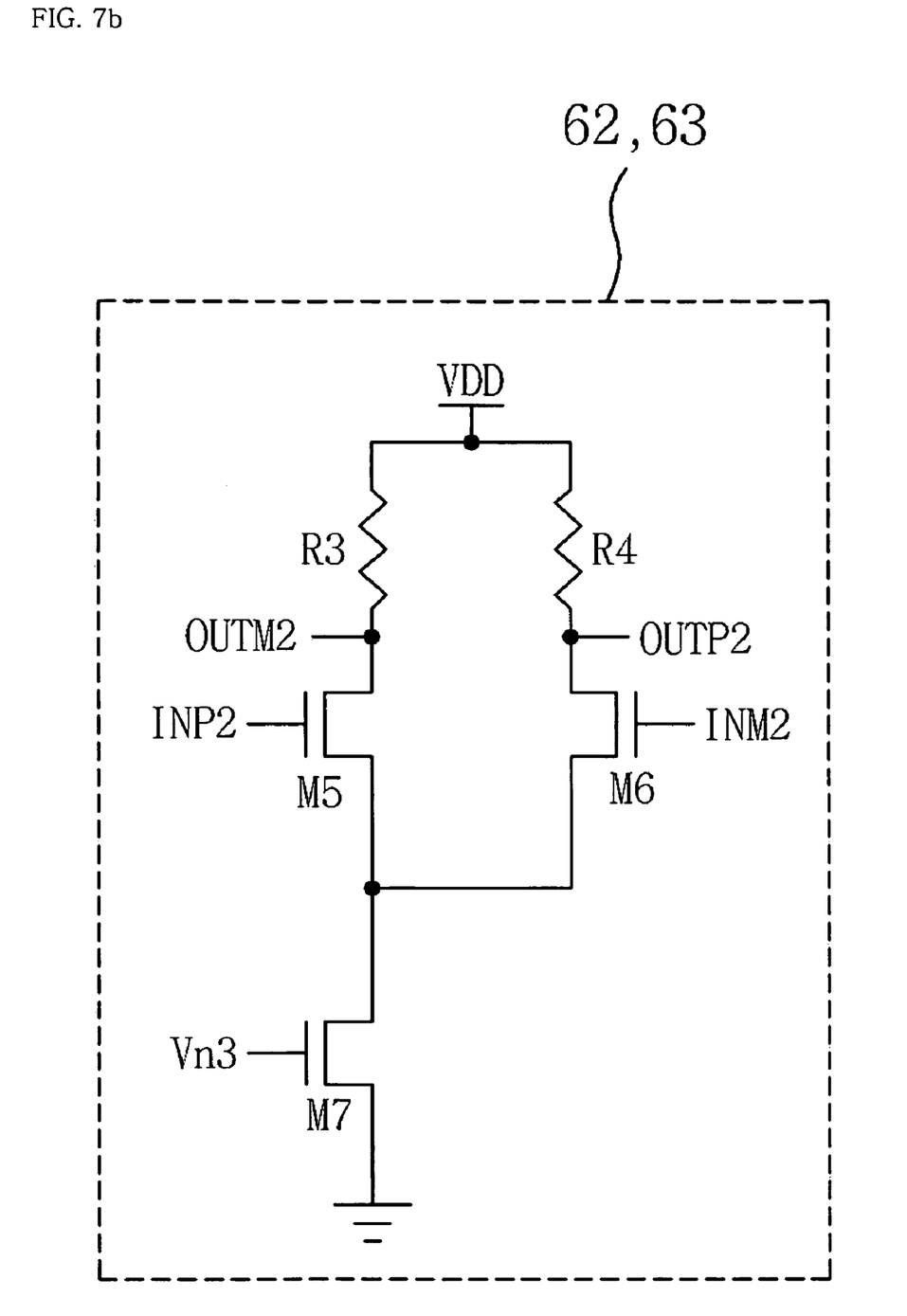

FIG. 7b is a detailed circuit diagram illustrating the two amplifiers 62 and 63 of FIG. 6. The two amplifiers 62 and 63 comprise a third resistor R3, a fourth resistor R4, a fifth NMOS transistor to a seventh NMOS transistor M5, M6, and M7. Each of the third resistor R3 and the fourth resistor R4 has one end commonly connected to a power supply terminal VDD. Drain ends of the fifth NMOS transistor M5 and the sixth NMOS transistor M6 are connected to the other ends of the third resistor R3 and the fourth resistor R4, respectively. Gates of the fifth NMOS transistor M5 and the sixth NMOS transistor M6 receive differential inputs INP2 and INM2, respectively, and source ends of the fifth NMOS transistor M5 and the sixth NMOS transistor M6 are commonly connected. The seventh NMOS transistor M7 has a drain end connected to the commonly connected source end of the fifth NMOS transistor M5 and the sixth NMOS transistor M6 and a gate receiving a fixed voltage Vn3. At this point, reference denotations OUTM2 and OUTP2 represent differential output terminals, respectively.

Figure 7C:
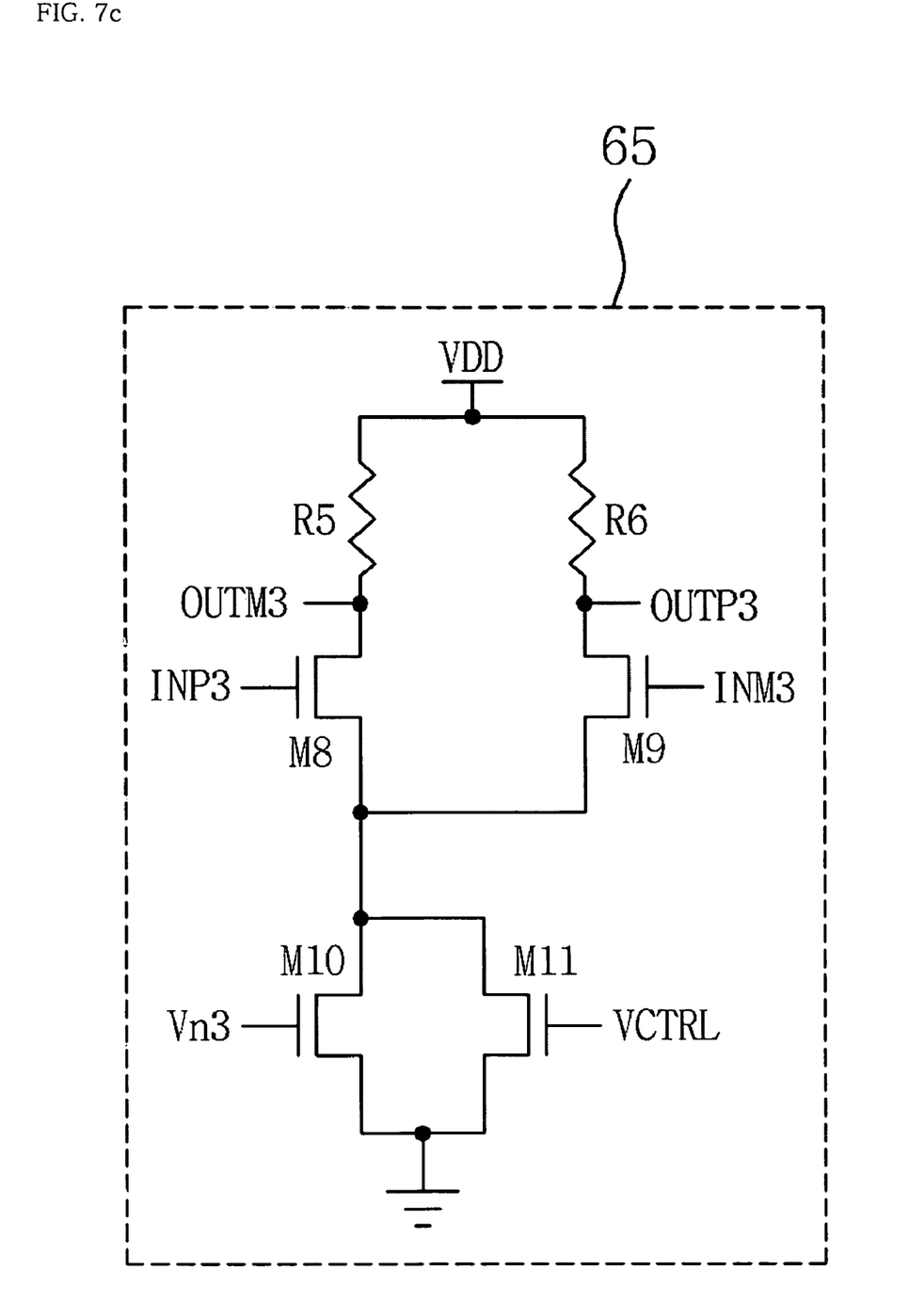

FIG. 7c is a detailed circuit diagram illustrating the amplifier 65 of FIG. 6. The amplifier 65 comprises a fifth resistor R5, a sixth resistor R6, an eighth NMOS transistor to an eleventh NMOS transistor M8, M9, M10, and M11. Each of the fifth resistor R5 and the sixth resistor R6 has one end commonly connected to a power supply terminal VDD. The eighth NMOS transistor M8 and the ninth NMOS transistor M9 have drain ends connected with the other ends of the fifth resistor R5 and the sixth resistor R6 and gates receiving differential inputs INP3 and INM3, respectively. Also, the eighth NMOS transistor M8 and the ninth NMOS transistor M9 have a commonly connected source end, and serve a differential amplification function. The tenth NMOS transistor M10, which operates as a fixed current source, has a drain end connected with the commonly connected source end of the eighth NMOS transistor M8 and the ninth NMOS transistor M9 and a gate receiving the fixed voltage Vn3. The eleventh NMOS transistor M11 has a drain end connected with the commonly connected source end of the eighth NMOS transistor M8 and the ninth NMOS transistor M9 and has a gate receiving the gain control signal VCTRL generated at the adaptive loop 50 illustrated in FIG. 4. The eleventh NMOS transistor M11 operates as a variable current source. At this point, reference denotations OUTM3 and OUTP3 represent differential output terminals.

Hereinafter, operation of the first filter to the fourth filter 41, 42, 43, and 44 will be described in detail.

With respect to a high frequency component determined by coefficients of the third resistor R3 and the third capacitor C3 of the high pass filter 66, the high frequency amplifier 61 amplifies the differential inputs INP1 and INM1 to a predetermined gain rate. In more detail, the high frequency amplifier 61 amplifies a high frequency gain to a predetermined amplification rate considering that a high frequency component of a signal passing through a channel has a lower amplitude level than a low frequency component. Thus, the high frequency amplifier 61 can reduce an amplification burden on the gain controller 64.

The two amplifiers 62 and 63 are a typical common source differential amplifier. Particularly, the two amplifiers 62 and 63 amplify the entire broadband frequency components of an output signal of the high frequency amplifier 61 to a predetermined gain rate. As a result, the two amplifiers 62 and 63 can sufficiently compensate an amplitude loss of a low frequency component, which may occur in a channel.

The amplifier 65 of the gain controller 64 controls a current amount of the eleventh NMOS transistor M11 according to the gain control signal VCTRL. As illustrated in FIG. 8e, if a voltage level of the gain control signal VCTRL gradually increases at the beginning of the convergence, the current amount of the eleventh NMOS transistor M11 increases, and the first capacitor C1 and the second capacitor C2 transfer an alternating current component directly to final differential outputs OUTP and OUTM. Therefore, the gain controller 64 controls a high frequency gain according to the gain control signal VCTRL. After a predetermined time, the gain control signal VCTRL is converged into a certain voltage level, and thus, the gain controller 64 maintains a consistent level of the high frequency gain.

Different from the conventional equalizing filters, the first filter to the fourth filter 41, 42, 43, and 44 according to the present embodiment are not compelled to have an additional low frequency loop to adjust a low frequency gain. As a result, a simplified circuit can be implemented, and there is no struggling event, which usually occurs when the high frequency loop and the low frequency loop exists concurrently. This result further brings out a stable operation.

With reference to FIGS. 8a through 8f, operation of the high speed line equalizer according to the present embodiment will be described in detail.

Figure 8A:
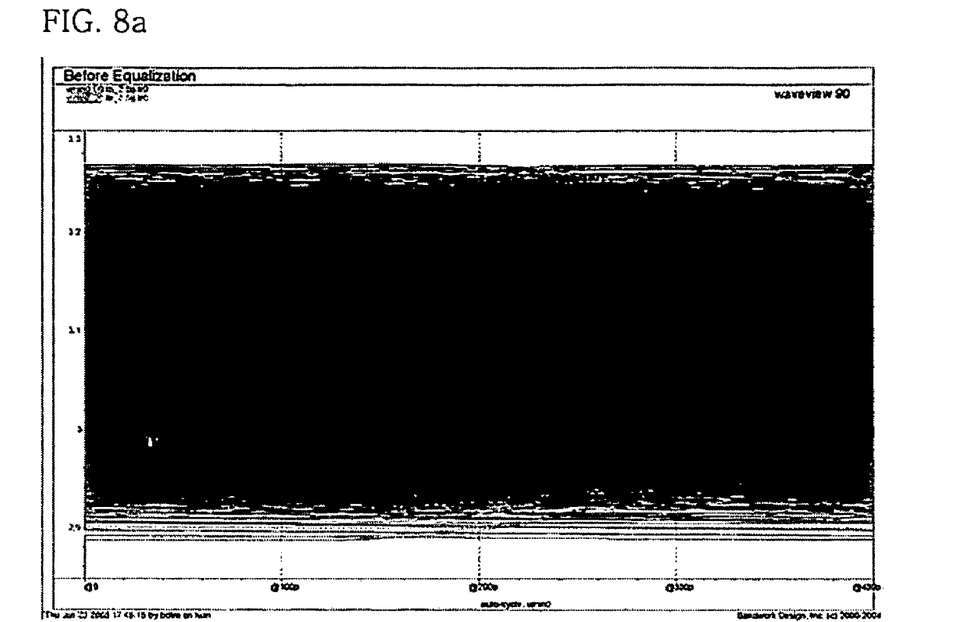
FIGS. 8a and 8b illustrate eye patterns before and after operation of the equalizing filters illustrated in FIG. 4 with respect to data signals.
Figure 8B:
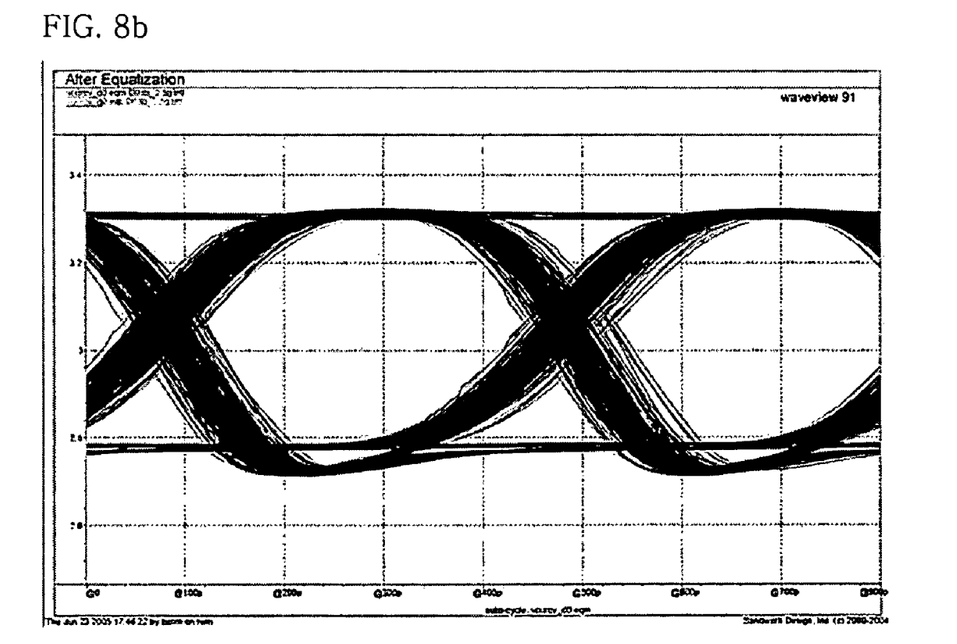

FIG. 8a is a diagram illustrating an eye pattern after a signal of approximately 2.5 GPS passes through approximately 14 meters of an American Wire Gauge (AWG) 28 cable. FIG. 8b is a diagram illustrating an eye pattern of an equalized signal provided from the first filter to the fourth filter 41, 42, 43, and 44.

As illustrated in FIG. 8a, as the three data channel signals INA, INB and INC and the clock channel signal INCLK, which are inputted to the first filter to the fourth filter 41, 42, 43, and 44, respectively, pass through the channels, the eye pattern thereof is closed due to various factors such as the skin effect of the channels and the inter-symbol interference. The closed eye pattern indicates that the three data channel signals INA, INB and INC and the clock channel signal INCLK cannot be recovered. Hence, equalizing these channel signals INA, INB, INC, and INCLK through the first filer to the fourth filter 41, 42, 43, and 44 sufficiently opens the eye pattern as illustrated in FIG. 8b. The opened eye pattern means that these channel signals INA, INB, INC, and INCLK can be recovered.

Figure 8C:
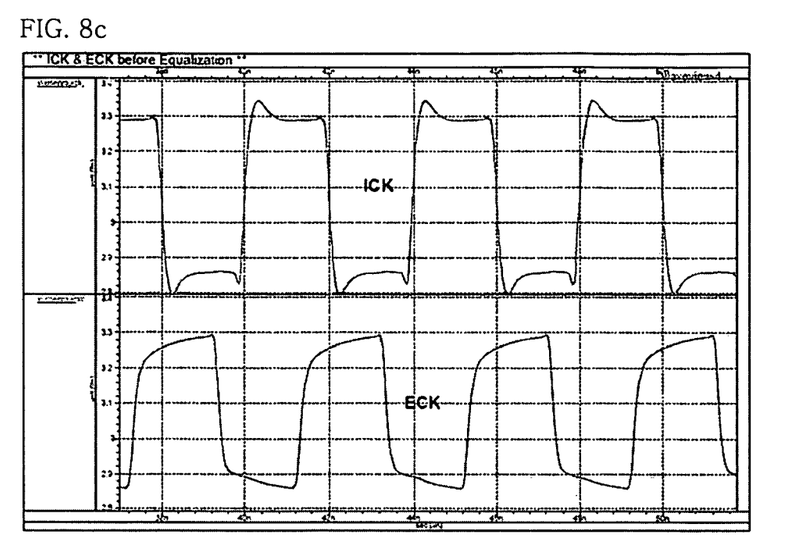
FIGS. 8c and 8d are waveform views before and after operation of the equalizing filters of FIG. 4 with respect to a clock signal.
Figure 8D:
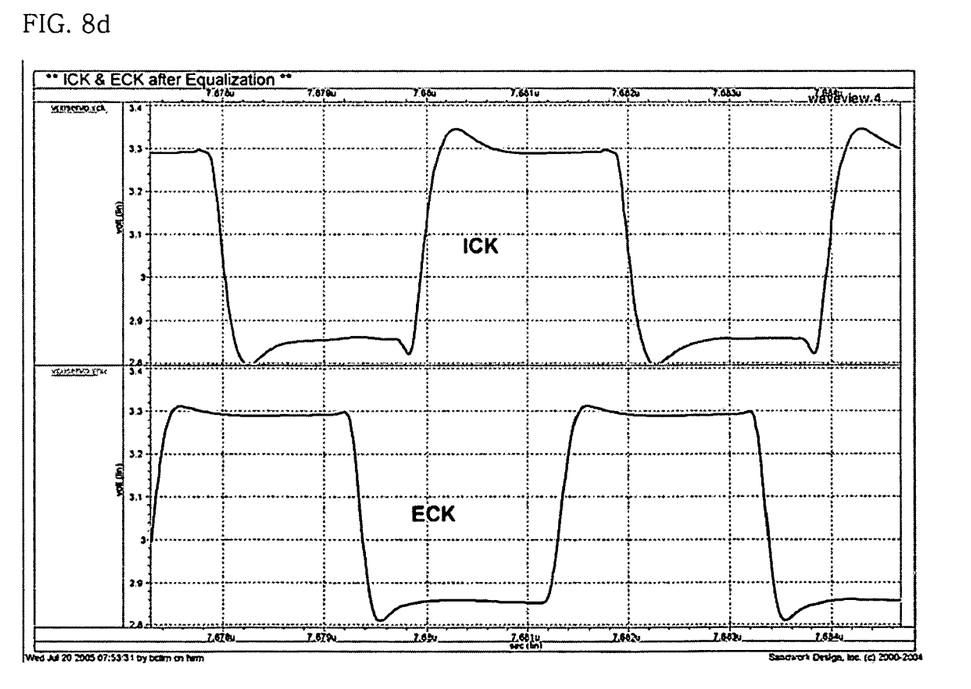
Figure 8E:
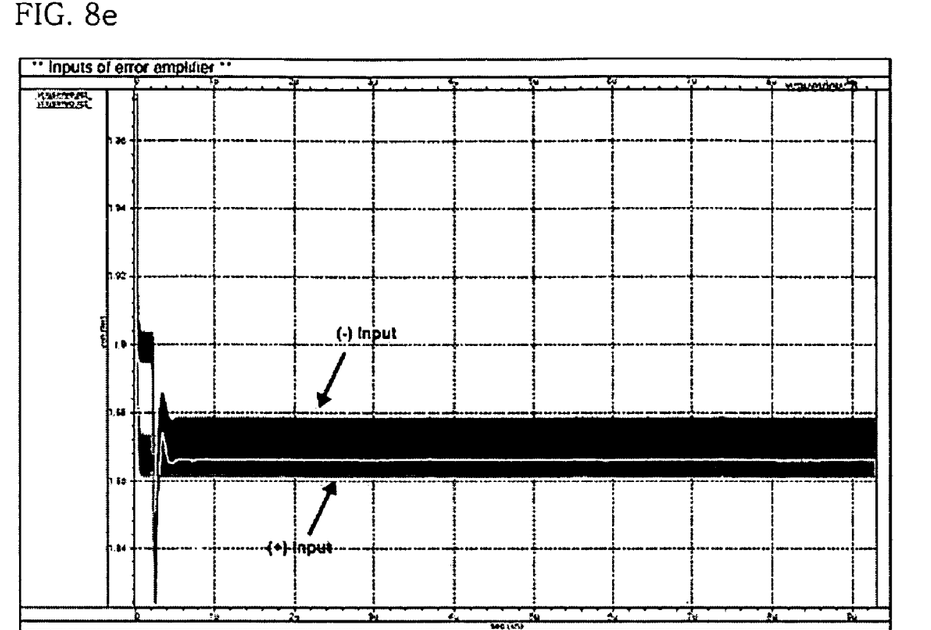
FIGS. 8e and 8f are waveform views of input/output signals of an error amplifier illustrated in FIG. 5.
Figure 8F:
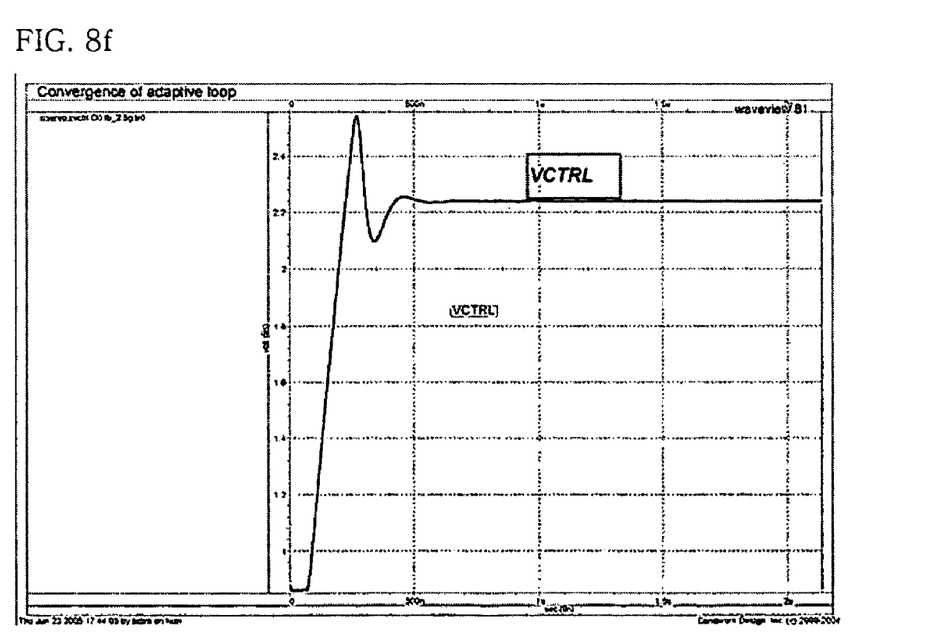

FIGS. 8c and 8d are waveform views of the buffered clock signal ICK and the filtered clock signal ECK before and after the equalization. After the equalization, the filtered clock signal ECK is converted into an ideal waveform. FIG. 8e is a waveform view illustrating a positive (+) input and a negative (−) input of the error amplifier 56 of FIG. 5. As undergoing an initialization process, a high frequency gain of the filtered clock signal ECK is converged into a high frequency gain value of the buffered clock signal ICK. Therefore, as illustrated in FIG. 8e, the gain control signal VCTRL of the error amplifier 56 is gradually converged into a certain level as time elapses.

In the high speed line equalizer and the method thereof according to the embodiment of the present invention, one adaptive loop using the clock signal that do not have the inter-symbol interference but have a specific frequency range is provided, and the multiple data channels are equalized using the adaptive loop. As a result, the circuit area and power consumption can be reduced in a greater extent. Also, since the adaptive loop is configured using the clock signal, a stable operation can be achieved.

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

What is claimed is:

1. A high speed line equalizer for equalizing at least one data signal, the high speed line equalizer comprising:
    an input buffer for amplifying a clock signal;
    a first filter for controlling a high frequency gain of the clock signal according to a gain control signal;
    at least one second filter for controlling a high frequency gain of the at least one data signal according to the gain control signal; and
    an adaptive loop for calculating a high frequency gain difference between the amplified clock signal from the input buffer and the controlled clock signal from the first filter and for outputting the high frequency gain difference as the gain control signal.

2. The high speed line equalizer as claimed in claim 1, wherein the first filter or the at least one second filter comprises:
    a first amplifier for amplifying a high frequency gain of a corresponding input signal;
    a second amplifier for amplifying an output signal of the first amplifier; and
    a gain controller for controlling a high frequency gain of an output signal of the second amplifier according to the gain control signal.

3. The high speed line equalizer as claimed in claim 2, wherein the first amplifier comprises:
    a first resistor and a second resistor each having one end commonly connected to a first power supply terminal;
    a first transistor and a second transistor each having one end of a main current path connected to the other end of each of the first resistor and the second resistor;
    a high pass filter connected to the other end of the main current path of the first transistor and the second transistor and for performing a high pass filtering operation; and
    a first current source and a second current source each connected between a corresponding end of the high pass filter and a second power supply terminal.

4. The high speed line equalizer as claimed in claim 3, wherein the high pass filter comprises a resistor and a capacitor both being connected in parallel.

5. The high speed line equalizer as claimed in claim 2, wherein the second amplifier comprises:
    a third resistor and a fourth resistor each having one end commonly connected to a first power supply terminal;
    a third transistor and a fourth transistor each having one end of a main current path connected to the other end of each of the third resistor and the fourth resistor and for performing a differential amplification operation to a corresponding input signal, wherein the other ends of the main current path of the third transistor and the fourth transistor are connected to each other; and
    a third current source connected between the other end of the main current path of the third transistor and a second power supply terminal.

6. The high speed line equalizer as claimed in claim 2, wherein the gain controller comprises:
    a fifth resistor and a sixth resistor each having one end commonly connected to a first power supply terminal;
    a fifth transistor and a sixth transistor each having one end of a main current path connected to the other end of each of the fifth resistor and the sixth resistor and for performing a differential amplification operation to a corresponding input signal, wherein the other ends of the main current path of the fifth transistor and the sixth transistor are connected to each other;
    a fourth current source connected between the other end of the main current path of the fifth transistor and a second power supply terminal; and
    a seventh transistor for receiving the gain control signal wherein both ends of main current path of the seventh transistor connect to both ends of the fourth current source in parallel.

7. The high speed line equalizer as claimed in claim 1, wherein the adaptive loop comprises:
    a first high pass filter and a second high pass filter for separating high frequency components of output signals from the input buffer and the first filter, respectively;
    a first rectifier and a second rectifier for rectifying output signals of the first high pass filter and the second high pass filter, respectively; and
    an error amplifier for amplifying a gain difference between output signals of the first rectifier and the second rectifier and for outputting the gain difference as the gain control signal.

8. A high speed line equalizing method for equalizing at least one data signal, the high speed line equalizing method comprising:
    controlling with a controller high frequency gains of a clock signal and the at least one data signal according to a gain control signal;
    calculating with an adaptive loop a high frequency gain difference between the clock signal and the clock signal of which the high frequency gain is controlled; and
    amplifying with an amplifier the high frequency gain difference to thereby output the amplified high frequency gain difference as the gain control signal.

* * * * *